US012716467B2

(12) United States Patent
Matsuo

(10) Patent No.: US 12,716,467 B2
(45) Date of Patent: Aug. 25, 2026

(54) BALANCER DEVICE FOR INTERNAL COMBUSTION ENGINE

(71) Applicant: HITACHI ASTEMO, LTD., Hitachinaka (JP)

(72) Inventor: Masatoshi Matsuo, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 19/111,254

(22) PCT Filed: Dec. 1, 2023

(86) PCT No.: PCT/JP2023/043104

§ 371 (c)(1),
(2) Date: Mar. 12, 2025

(87) PCT Pub. No.: WO2024/142758

PCT Pub. Date: Jul. 4, 2024

(65) Prior Publication Data

US 2025/0369500 A1 Dec. 4, 2025

(30) Foreign Application Priority Data

Dec. 28, 2022 (JP) ................................ 2022-211235

(51) Int. Cl.
*F16F 15/26* (2006.01)
*F02B 77/00* (2006.01)

(52) U.S. Cl.
CPC ............ *F16F 15/265* (2013.01); *F02B 77/00* (2013.01)

(58) Field of Classification Search
CPC .............................. F16F 15/264; F16F 15/265
(Continued)

(56) References Cited

U.S. PATENT DOCUMENTS 6,868,816 B2 * 3/2005 Hiraki .................. F16F 15/264 123/192.2
10,119,594 B2 * 11/2018 Tsukamoto ........... F16F 15/264
(Continued)

FOREIGN PATENT DOCUMENTS

JP 2008-014351 A 1/2008
JP 2009162307 A * 7/2009

OTHER PUBLICATIONS

International Search Report dated Feb. 13, 2024 in International Application No. PCT/JP2023/043104, with English translation, 7 pages.

(Continued)

*Primary Examiner* — Logan M Kraft
*Assistant Examiner* — Joshua Campbell
(74) *Attorney, Agent, or Firm* — FOLEY & LARDNER LLP

(57) ABSTRACT

The balancer device includes: an idler shaft having an idler sprocket around which a drive chain is wound, and an idler gear integrated with the idler sprocket; and a balancer housing accommodating, thereinside, balancer shafts generating a vibratory force by the rotation force transmitted from the idler gear. The balancer housing includes: a support part which is provided on the outer part of an upper housing, and supports an end portion of the idler shaft; a boss portion which is provided at a position away from the support part; and a first reinforcing part and second reinforcing part which are disposed between the support part and the fixing portion to reinforce the lower part on the lower housing side of the support part. Consequently, it is possible to suppress the occurrence of noise and vibration between an idle gear and a drive side gear.

8 Claims, 10 Drawing Sheets

(58) Field of Classification Search
USPC ............ 123/192.1, 192.2; 29/888.01; 474/12
See application file for complete search history.

(56) References Cited

U.S. PATENT DOCUMENTS

| | | | | |
|---|---|---|---|---|
| 2003/0106518 A1* | 6/2003 | Purcell | F01M 11/02 | 123/192.2 |
| 2008/0009376 A1* | 1/2008 | Onigata | F16F 15/265 | 474/12 |
| 2015/0075477 A1* | 3/2015 | Kitamura | F16F 15/267 | 123/192.2 |
| 2016/0123450 A1* | 5/2016 | Corbett | F16F 15/267 | 123/192.2 |
| 2016/0131221 A1* | 5/2016 | Okabe | F16F 15/267 | 123/192.2 |

OTHER PUBLICATIONS

Written Opinion of the International Searching Authority dated Feb. 13, 2024 in International Application No. PCT/JP2023/043104, provided as English translation, and Forms PCT/IB/338 and 373, 12 pages.

* cited by examiner 10
11
12
12a
12b
12c
13
13a
13b
14
15
17
19b
20a
20b
20c
21
21a
21b
22
22a
22b
23
24
25
28
30
31
32
34
37
38
39
A
B
C
D
E 34
30
32
24
31
12c
23
25
22
18
37a
29
37
37b
21a'
21'
19a
12
13

25
30
34
24
32
31
22
18
22b
37a
38a
37
29
39
38
28 (28a)
37b
38b
18
17
16
19b
19a
18
12

BALANCER DEVICE FOR INTERNAL COMBUSTION ENGINE

TECHNICAL FIELD

The present invention relates to a balancer device for reducing secondary vibration in an internal combustion engine.

BACKGROUND TECHNOLOGY

The following patent document 1 describes a conventional balancer device for an internal combustion engine. In brief, it is provided with a housing attached to the lower part of a crankcase of the engine and accommodated in an oil pan, a drive side balancer shaft that is rotatably accommodated and supported via a pair of sliding bearings provided at a predetermined distance in the axial direction of the housing and to which rotation force is transmitted from the crankshaft, and a driven side balancer shaft that is rotatably accommodated and supported by a pair of sliding bearings provided at a predetermined distance in the axial direction of the housing and to which rotation force is transmitted from the drive side balancer shaft.

The drive side balancer shaft is configured to receive the rotation force transmitted from the crankshaft via a drive chain wound around a drive side sprocket at the front end portion. In addition, the drive side balancer shaft is also provided with a pair of counterweights.

The driven side balancer shaft mentioned above is configured to receive the rotation force transmitted from a drive gear provided to the drive side balancer shaft via a driven gear. In addition, a pair of counterweights are also provided integrally with the driven side balancer shaft.

Then, when the engine starts and the crankshaft starts rotating, the drive side balancer shaft rotates at twice the speed of the crankshaft via the drive side sprocket of the drive side balancer shaft, around which the drive chain is wound. At the same time, the driven side gear which meshes with the drive side gear rotates in the opposite direction by the rotation of the drive side gear, and then the driven side balancer shaft is driven and rotates in the opposite direction to the drive side balancer shaft. Consequently, secondary vibration in the internal combustion engine is effectively suppressed by the rotation of each of the counterweights.

PRIOR ART DOCUMENT(S)

Patent Document(s)

Patent Document 1: Japanese Patent Application Publication No. 2008-14351

SUMMARY OF THE INVENTION

Problem to be Solved by the Invention

By the way, in the balancer device mentioned above, as a transmission mechanism to transmit the rotation force of the crankshaft to the drive side balancer shaft, in addition to the method for directly transmitting the rotation force of the crankshaft to the drive side balancer shaft via the drive chain, as mentioned above, there is also a method that uses an idler shaft provided on the side part of the drive side balancer shaft.

In this case, due to the layout of the individual components, a support part is provided integrally to the outer side part of the housing, and the idler shaft mentioned above is pivotally supported by this support part. This idler shaft includes an idler sprocket around which the drive chain is wound, and an idler gear that is integrally provided with the idler sprocket and meshes with the drive side gear. An idler driven gear that meshes with the idler gear is provided to the distal end portion of the drive side balancer shaft. The rotation force of the crankshaft is transmitted to the drive side balancer shaft from the drive chain via the idler sprocket, idler gear, and idler driven gear.

However, in the transmission mechanism using the idler shaft, a relatively large pulling force (tension) in the direction of the crankshaft by the drive chain is applied to the idler shaft via the idler sprocket.

By the analysis, it has been found that this large pulling force causes deformation in the supporting part supporting the idler shaft, and the idler shaft easily inclines in the direction of the crankshaft, and there is a risk of misalignment occurring between the idler gear and the idler driven gear. As a result, there is a risk of abnormal noise and vibration occurring between the idler gear and the drive side gear due to the meshing of the gears, as well as uneven wear occurring between the two gears over time.

The present invention has been made in consideration of such a technical problem of the conventional balancer device, and an object of the present invention is to provide a balancer device for an internal combustion engines that can suppress the occurrence of noise and vibration by increasing the rigidity of the support part to suppress the idler shaft from inclination so as to reduce misalignment between the idler gear and the drive side gear.

Means for Solving the Problem

The invention described in claim 1 includes: an idler shaft holding an idler sprocket around which a drive chain is wound, and an idler gear which is rotatable with the idler sprocket; a pair of balancer shafts which have balancer weights for generating a vibratory force by a rotation force transmitted from the idler gear; an upper housing disposed between the pair of balancer shafts and the internal combustion engine; and a lower housing which comes in contact with the upper housing via a mating surface, and rotatably holds the pair of balancer shafts in a space formed between the upper housing and the lower housing; wherein the upper housing has: a support part which supports one end portion in an axial direction of the idler shaft; a fixing portion which is provided at a position away from the support part, and comes in contact with the internal combustion engine; and a first reinforcing part which is disposed to connect between the support part and the fixing portion, and reinforces a part on a lower housing side of the support part.

Effect of the Invention

According to the present invention, by reducing the misalignment between the idler gear and the drive side gear, the occurrence of noise and vibration can be suppressed.

MODE FOR IMPLEMENTING THE INVENTION

In the following, an embodiment in which a balancer device according to the present invention is applied, for example, to an in-line four-cylinder internal combustion engine of an automobile will be explained based on the drawings.

First Embodiment

Figure 1:
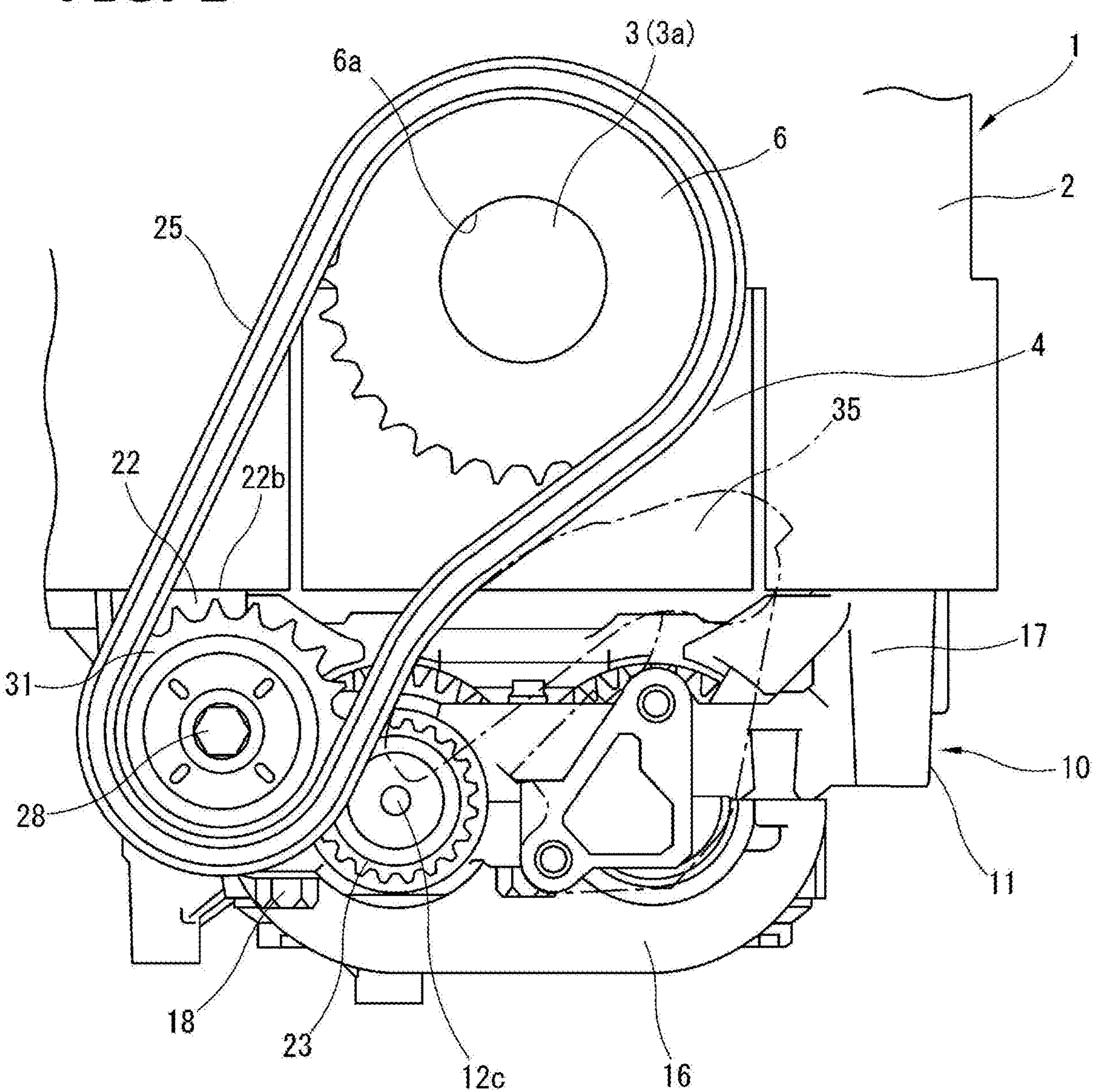
FIG. 1 is a main part front view showing a state in which one embodiment of a balancer device according to the present invention is mounted to an internal combustion engine.
Figure 2:
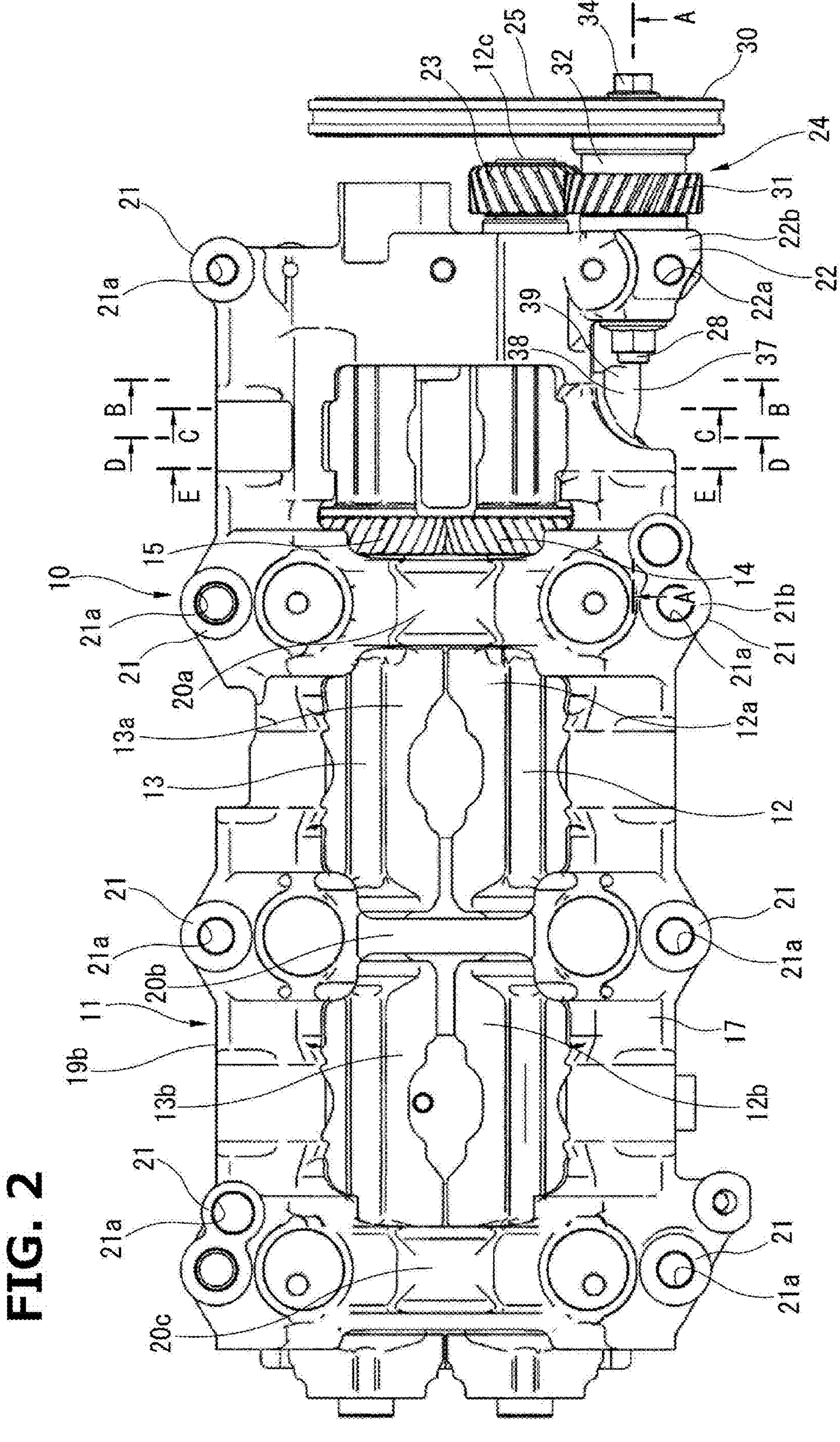
FIG. 2 is a plane view of the balancer device according to the present embodiment.
Figure 3:
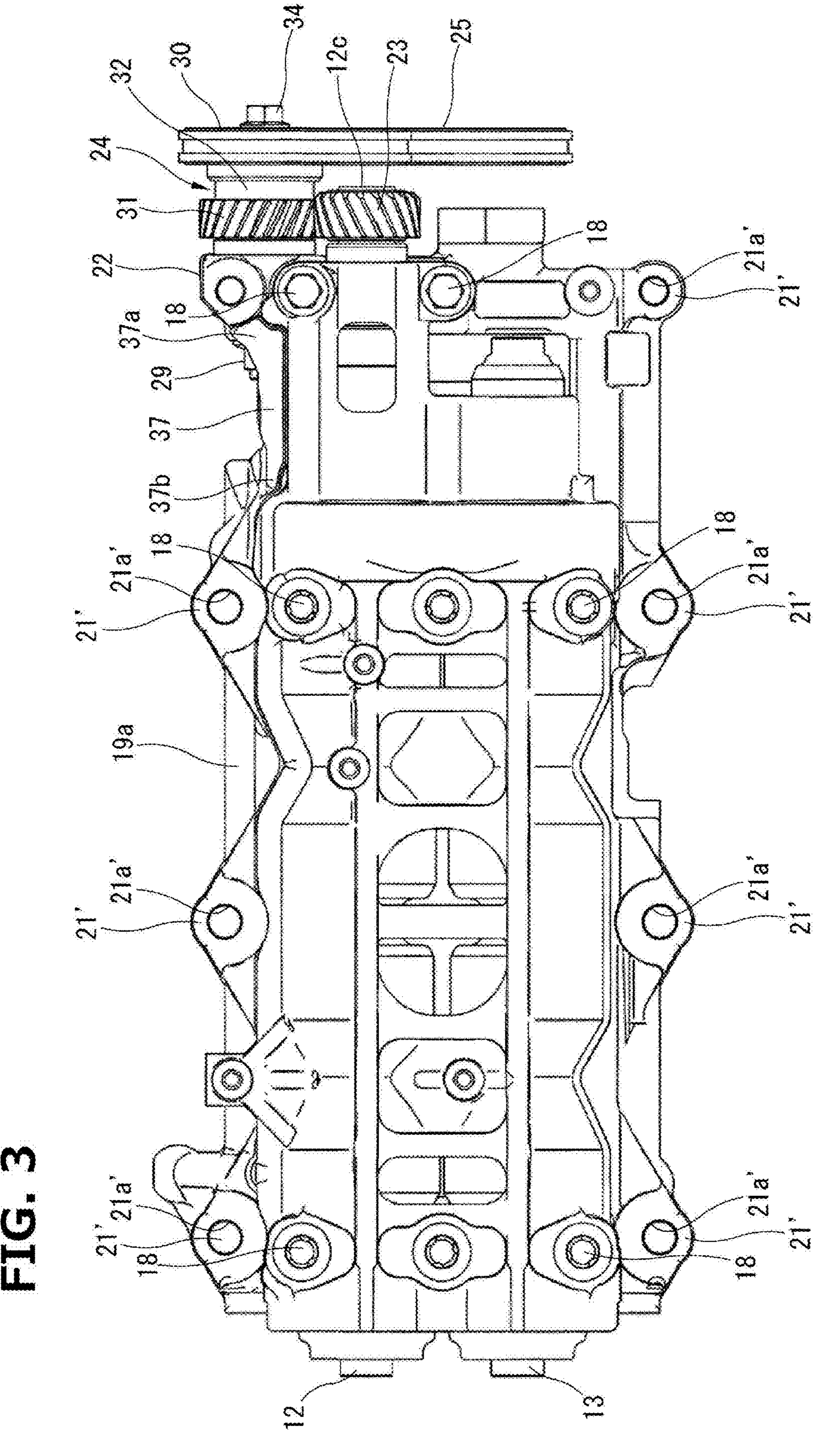
FIG. 3 is a bottom view of the balancer device according to the present embodiment.
Figure 4:
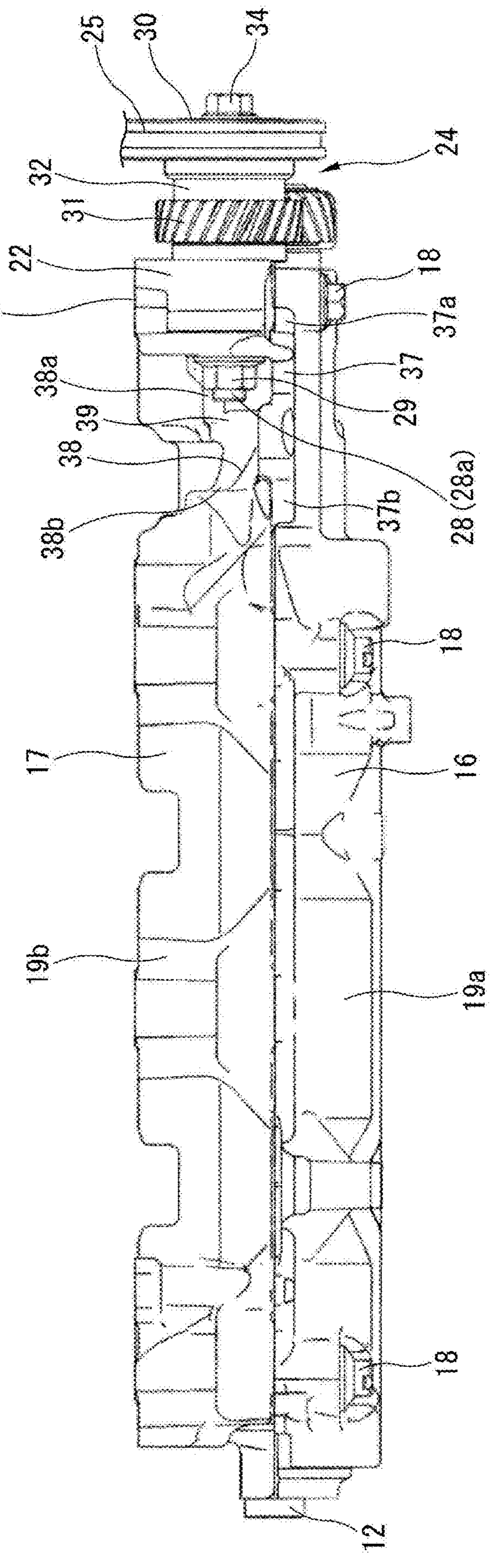
FIG. 4 is a side view of the balancer device according to the present embodiment.

FIG. 1 is a Main part front view showing a state in which one embodiment of a balancer device according to the present invention is mounted to an internal combustion engine, FIG. 2 is a plane view of the balancer device according to the present embodiment, FIG. 3 is a bottom view of the balancer device according to the present embodiment, and FIG. 4 is a side view of the balancer device according to the present embodiment.

As shown in FIG. 1, a bearing cap 4 having a bearing portion that pivotally supports a crankshaft 3 is fixed to the lower part of a cylinder block 2 of an internal combustion engine 1, and an oil pan not shown which is an upper and lower split type and stores engine oil thereinside is attached to the lower part of the bearing cap 4.

The crankshaft 3 is rotatably supported by a plurality of bearings, such as bearing caps which are connected to the lower part of the cylinder block 2 by bearing bolts, and a crank sprocket 6 having a large diameter is attached to a shaft end portion 3*a* integrally provided on the front end side of the crankshaft 3.

The crank sprocket 6 is joined to the shaft end portion 3*a* of the crankshaft 3 through an insertion hole 6*a* formed in the center by shrink fitting.

A balancer device 10 for suppressing secondary vibration of the engine is accommodated and arranged in the space surrounded by the lower part of the cylinder block 2, the bearing cap 4, and the oil pan.

As shown in FIGS. 1 to 4, the balancer device 10 is provided with a balancer housing 11 fixed to the lower surface of the cylinder block 2, a drive side balancer shaft 12 and a driven side balancer shaft 13 arranged in parallel in the engine front-rear direction and rotatably supported in a space 11*a* inside the balancer housing 11, and a helical-type drive side gear 14 and driven side gear 15 which are provided at approximately the center of the both balancer shafts 12 and 13 respectively, and the teeth of which mesh with each other.

The balancer housing 11 mentioned above is composed of a lower housing 16 on an oil pan side and an upper housing 17 arranged on the upper part of the lower housing 16.

These two housings 16 and 17 are made of aluminum material in response to the need for weight reduction, and are fastened and fixed in the vertical direction using a plurality of fastening bolts 18.

The lower housing 16 and upper housing 17 are respectively formed with frame-shaped deck portions 19*a* and 19*b* having a predetermined width at the outer peripheral parts of the mating positions where frame-shaped deck portions 19*a* and 19*b* face each other from above and below, and three parallel first to third cross beam deck portions 20*a*, 20*b* and 20*c* for bearings are integrally formed and joined so as to cross the frame-shaped deck portions 19 and 20.

On the both sides of the lower housing 16 and upper housing 17, a plurality of boss portions 21 are integrally formed to form insertion holes 21*a* through which bolts not shown in the drawings that fix the balancer housing 11 to the cylinder block 2 pass.

The upper surface of the lower housing 16 is formed in a flat surface that can be in contact with the lower surface of the upper housing 17. In addition, as shown in FIG. 3, the lower housing 16 is formed with boss portions 21' that are also formed with insertion holes 21*a'* for inserting bolts, at respective positions corresponding to the boss portions 21 of the upper housing 17.

The lower surface of the upper housing 17 is also formed in a flat surface, and the upper surfaces of the respective boss portions 21 and a support part 22 described below, are formed as eight mounting surfaces 21*b* and 22*b* that come in contact with the lower surface of the cylinder block 2. Each of these mounting surfaces 21*b* and 22*b* is formed in a flat surface.

The drive side balancer shaft 12 is provided with a helical idler driven gear 23 at a distal end shaft portion 12*c* that protrudes forward from the balancer housing 11. This idler driven gear 23 transmits the rotation force from the crankshaft 3 to the drive side balancer shaft 12 via a drive chain 25 that is wound between the rotating transmission member 24 described later and the crank sprocket 6. With this, the both balancer shafts 12 and 13 rotate in opposite directions to each other via the drive side gear 14 and the driven side gear 15. In addition, the both balancer shafts 12 and 13 are set to rotate twice per rotation of the crankshaft 3. In addition, as shown in FIG. 1, the tension of the drive chain 25 is adjusted by a chain tensioner 35.

In addition, the distal end shaft portion 12*c* is rotatably supported by a split-type bearing, which is not shown in the drawings, formed between the lower housing 16 and the upper housing 17, and this bearing is vertically fixed by a pair of fastening bolts 18 that fasten the lower housing 16 and the upper housing 17.

As shown in FIG. 2, the drive side balancer shaft 12 has three cylindrical journal surfaces, which are not shown in the drawings, at the respective front end side, center, and rear end side in the axial direction, and two of these journal surfaces are rotatably supported by two plain bearings in the first and second bearing grooves, which are not shown in the drawings, formed at the positions of the first cross beam deck portion 20*a* and third cross beam deck portion 20*c* of the upper housing 17, respectively.

The drive side balancer shaft 12 has two semi-circular-shaped first and second counterweights 12*a* and 12*b*, which are integrally provided, at symmetrical positions in the front and rear of the second cross beam deck portion 20*b*. Although these two counterweights 12*a* and 12*b* have almost the same shape and the same weight, their circumferential formation positions are offset from each other by a predetermined angle.

The drive side gear 14 is fixed to the drive side balancer shaft 12 by press-fitting, and is sandwiched between thrust walls, which is not shown in the drawings, to restrict axial movement.

As shown in FIG. 2, the driven side balancer shaft 13 is formed to be shorter in axial length than the drive side balancer shaft 12, and the journal surfaces, which are not shown in the drawings, formed at two positions in the axial direction are rotatably supported by plain bearings in two semi-circular bearing grooves formed in the first cross beam deck portion 20*a* and the third cross beam deck portion 20*c*.

The driven side balancer shaft 13 has two semi-circular counterweights 13*a* and 13*b*, which are integrally provided, at symmetrical positions in the front and rear of the second cross beam deck portion 20*b*. These two counterweights 13*a* and 13*b* have almost the same shape and the same weight.

The driven side gear 15 is fixed to the driven side balancer shaft 13 by, for example, press-fitting, and, similar to the drive side gear 14, it is sandwiched inside a groove formed in the lower housing 16, namely, between thrust walls of the groove which face each other, to restrict axial movement.

Figure 5:
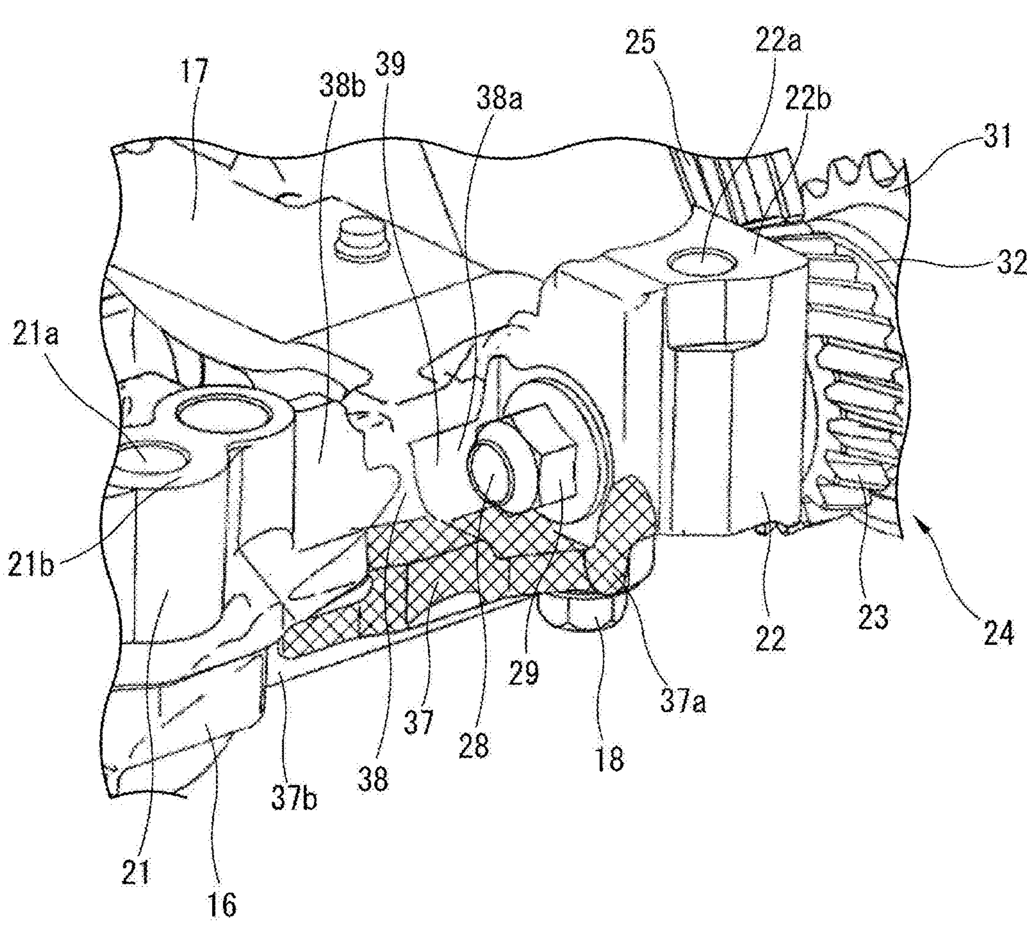
FIG. 5 is a perspective view showing a main part of the balancer device according to the present embodiment.
Figure 6:
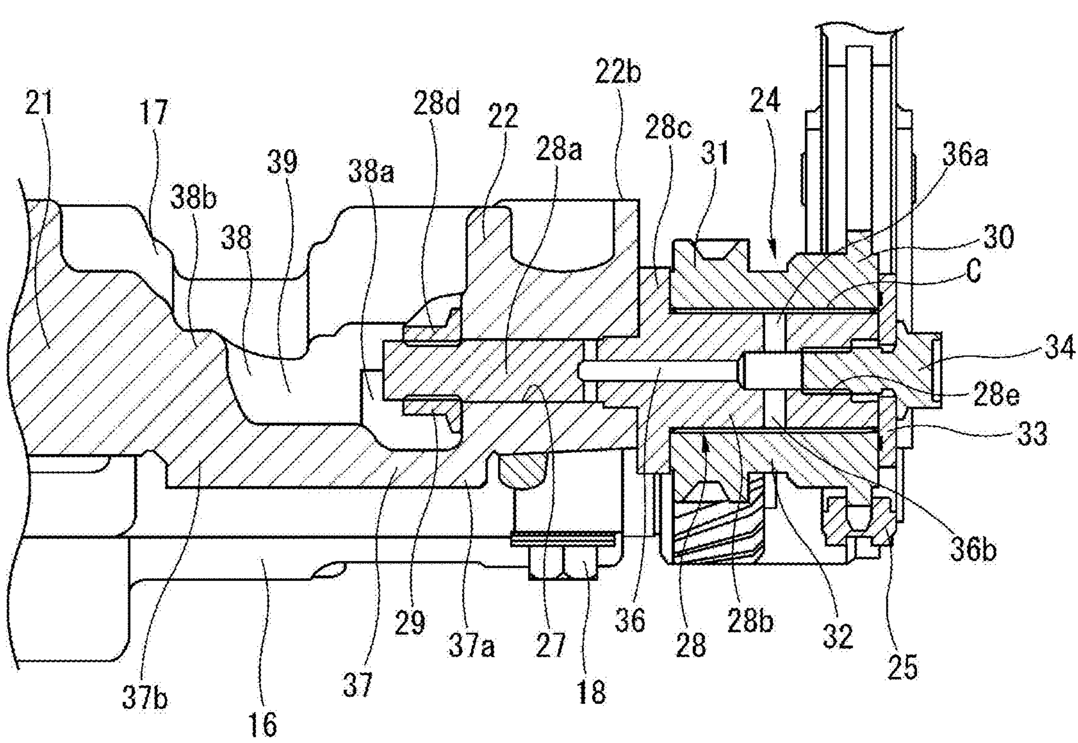
FIG. 6 is a sectional view taken along an A-A line of FIG. 2.
Figure 7:
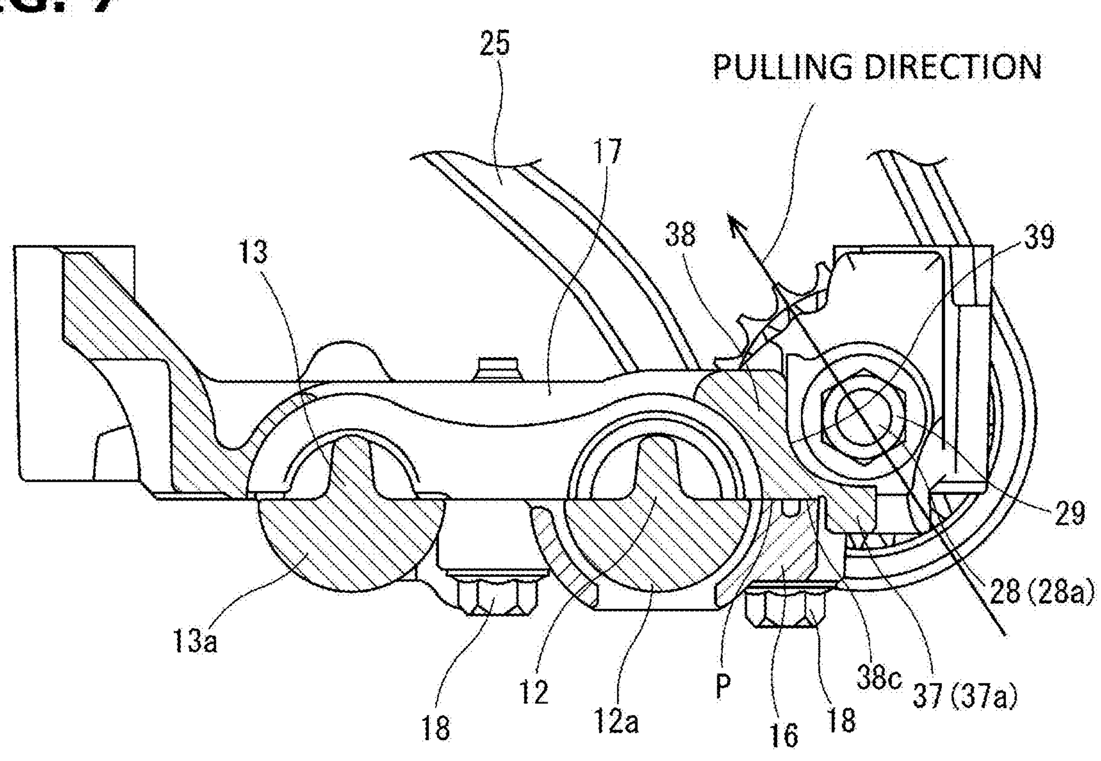
FIG. 7 is a perspective view in a cross section taken along a B-B line of FIG. 2.
Figure 8:
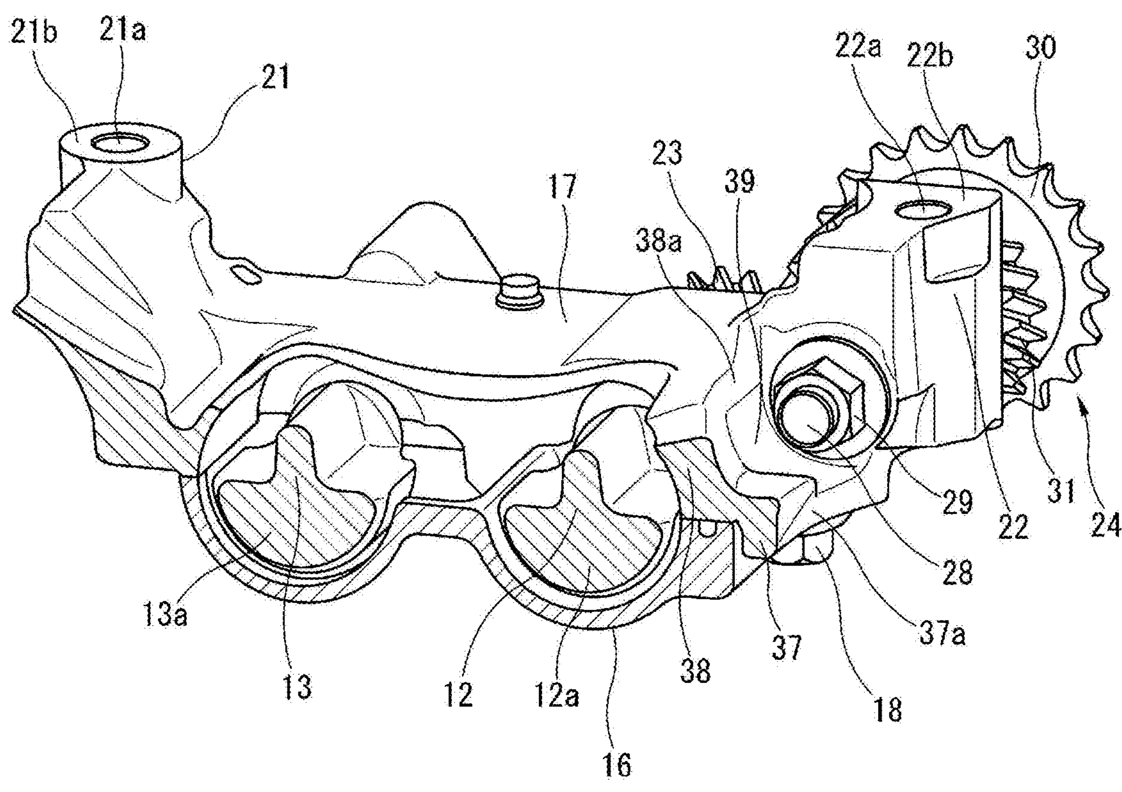
FIG. 8 is a perspective view in a cross section taken along a C-C line of FIG. 2.
Figure 9:
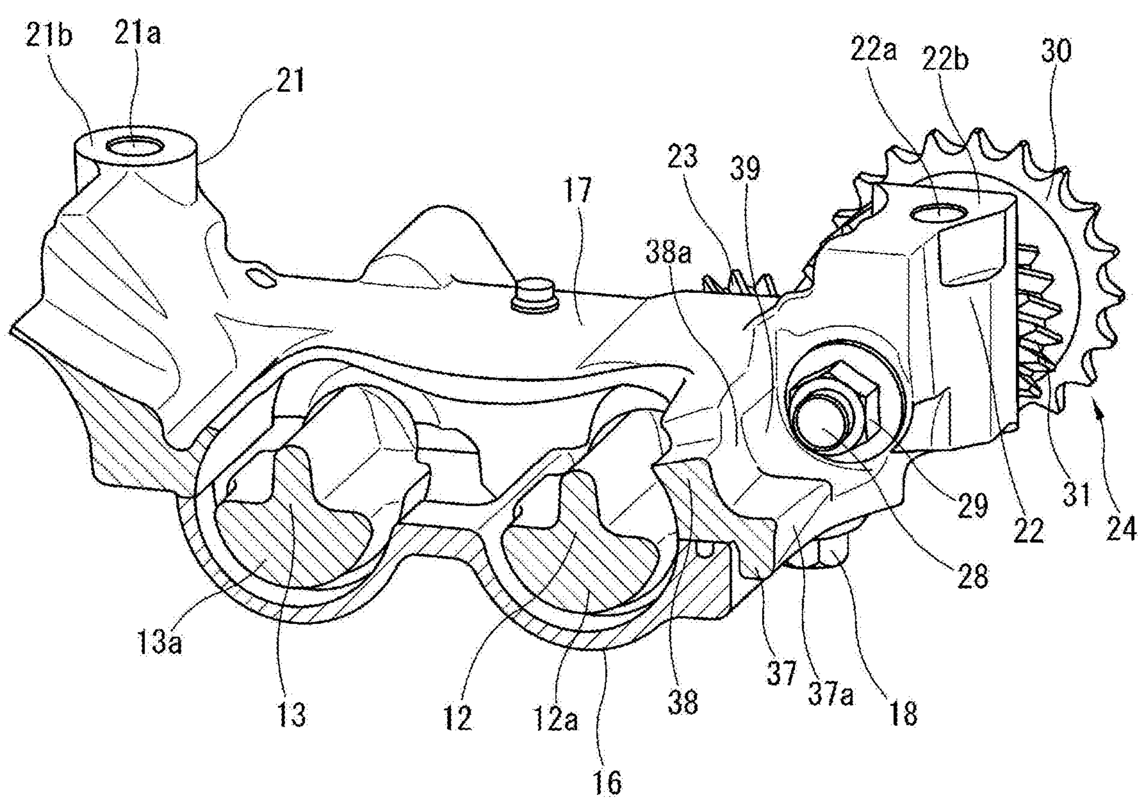
FIG. 9 is a perspective view in a cross section taken along a D-D line of FIG. 2.
Figure 10:
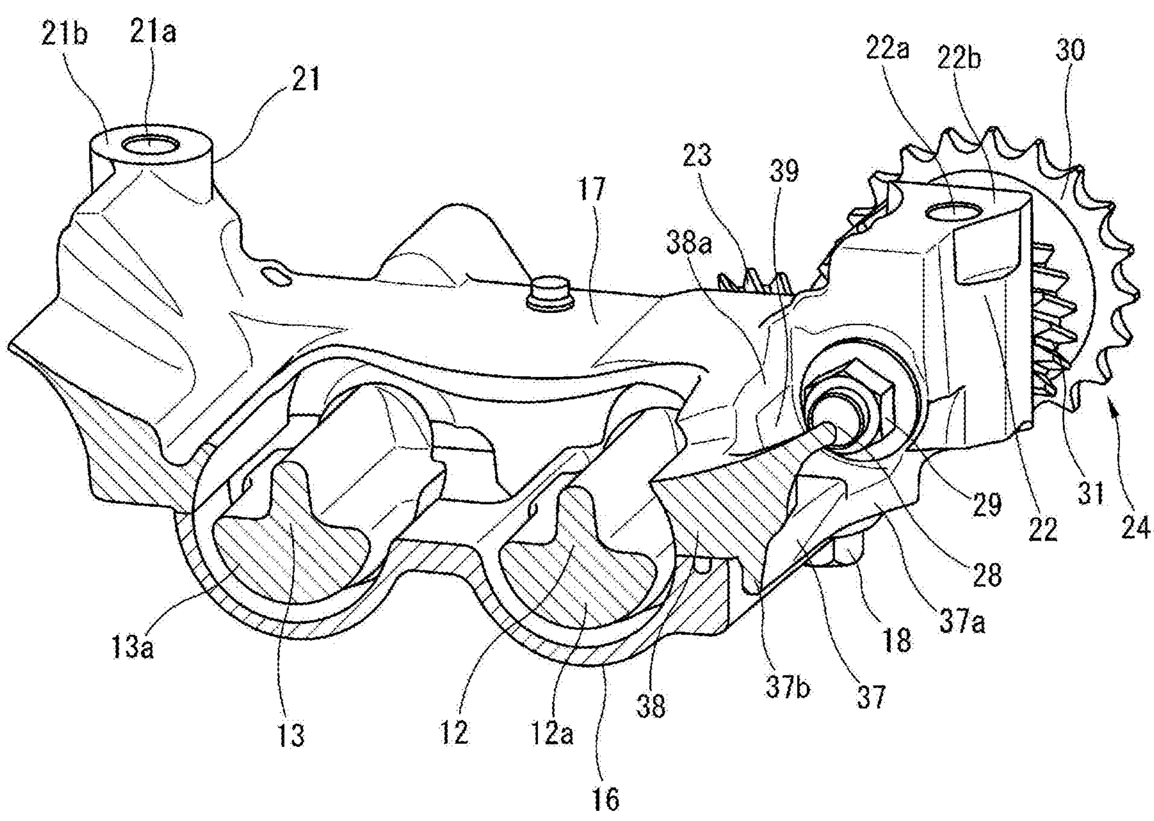
FIG. 10 is a perspective view in a cross section taken along an E-E line of FIG. 2.

FIG. 5 is a perspective view showing a main part of the balancer device according to the present embodiment, FIG. 6 is a sectional view taken along an A-A line of FIG. 2, FIG. 7 is a perspective view in a cross section taken along a B-B line of FIG. 2, FIG. 8 is a perspective view in a cross section taken along a C-C line of FIG. 2, FIG. 9 is a perspective view in a cross section taken along a D-D line of FIG. 2, and FIG. 10 is a perspective view in a cross section taken along an E-E line of FIG. 2.

As shown in FIGS. 1 and 2, a support part 22 for supporting one end portion of the idler shaft 28, which will be described later, is integrally provided with the upper housing 17 on the outer part of the front end portion of the upper housing 17.

As shown in FIGS. 5 to 10, the support part 22 is formed in a substantially block shape and made of aluminum material, which is the same material as the upper housing 17. As mentioned above, the support part 22 is integrally provided at the outside part on one side in the width direction of the frame-shaped deck portion 19 of the upper housing 17, due to the layout of the individual components, namely, for reasons such as avoiding the crankshaft 3 located above the balancer housing 11 and avoiding interference with the oil pan located below the balancer housing 11.

In addition, as mentioned above, the support part 22 has a bolt insertion hole 22*a* formed along the vertical direction, into which a bolt for fixing the balancer housing 11 to the cylinder block 2 in the vertical direction in the inside of the outside part, is inserted from the lower side in the internal vertical direction of the outer part, and a flat mounting surface 22*b* is formed on the upper side thereof.

The support part 22 has a through hole 27 that is formed at a position away from the bolt insertion hole 22*a* thereinside so as to penetrate parallel to the distal end shaft portion 12*c*, and the after-mentioned small diameter portion 28*a*, which is one end portion in the axial direction of the idler shaft 28, is inserted and supported in this through hole 27.

As shown in FIG. 6, the idler shaft 28 has a small diameter portion 28*a* inserted into the through hole 27 at one end portion in the axial direction, a large diameter portion 28*b* extending from the small diameter portion 28*a* toward the other end portion, and a flange portion 28*c* provided at the boundary between the small diameter portion 28*a* and the large diameter portion 28*b*.

The small diameter portion 28*a* is formed to have an outer diameter slightly smaller than the inner diameter of the through hole 27, and it is inserted into the inner peripheral surface of the through hole 27 so as to be inserted in a state of coming in tight contact with the inner peripheral surface of the through hole 27, and has a male screw part 28*d* formed on the outer peripheral surface on the side opposite to the large diameter portion 28*b* in the axial direction.

The idler shaft 28 is fixed to the support part 22 via the flange portion 28*c* by the fastening force of a nut 29 with a seat screwed onto the male screw part 28*d*.

The large diameter portion 28*b* is provided with a rotation transmission member 24 rotatably on the outer circumference thereof. This rotation transmission member 24 has an idler sprocket 30 which is provided on the distal end side thereof and around which the drive chain 25 is wound, and a helical idler gear 31 which is provided integrally with the idler sprocket 30 on the rear end side thereof, and meshes with the idler driven gear 23. The idler sprocket 30 and idler gear 31 are arranged apart from each other with a predetermined distance in the axial direction via an annular portion 32 provided in the center. In addition, the rotation transmission member 24 is restricted from moving freely in the axial direction by a disk-like restriction plate 33 provided at the distal end of the large diameter portion 28*b* and the flange portion 28*c*. The restriction plate 33 is fixed to the distal end surface of the large diameter portion 28*b* by a fixing bolt 34 screwed into a female screw hole 28*e* formed inside the distal end of the large diameter portion 28*b*.

In addition, an oil passage is formed inside the small diameter portion 28*a* and the large diameter portion 28*b* to allow lubricating oil to flow for lubrication between the large diameter portion 28*b* and the rotating transmission member 24. In other words, as shown in FIG. 6, an introduction passage 36 communicating with an oil supply passage not shown in the drawings that lubricates the bearing of each of the balancer shafts 12 and 13 is formed inside the small diameter portion 28*a* and the large diameter portion 28*b* in the axial direction, and branch passages 36*a* and 36*b* which branch out radially from the introduction passage 36 are provided inside the large diameter portion 28*b* to supply lubricating oil to a cylindrical gap C between the inner peripheral surface of the rotation transmission member 24 and the outer peripheral surface of the large diameter portion 28*b*.

Then, in the present embodiment, a first reinforcing part 37, which is a first thick part, and a second reinforcing part 38, which is a second thick part, that increase the rigidity of the support portion 22 are integrally provided with the upper housing 17 between the support part 22 and the boss portion 21 connected thereto. Here, the definition of "thick" for the first and second thick parts means that they are thicker than the thinnest part in the upper housing 17.

In other words, as shown in FIGS. 2, 4, 5 (shaded part) and 7 to 10, the first reinforcing part 37 is formed in a substantially rectangular shape in cross section, has an one end portion 37*a* integrally connected to the lower end part of the support part 22, is formed in a straight shape from the one end portion 37*a* toward the side part of the boss portion 21, and has an other end portion 37*b* of the first reinforcing part 37 which connected to the lower end part of the outer surface of the boss portion 21. In addition, the first reinforcing part 37 is arranged in the direction perpendicular to the mounting surface 22*b* of the support part 22 and parallel to a virtual line passing through the axis of the idler shaft 28.

Therefore, the first reinforcing part 37 is arranged to connect the lower end part of the support part 22 with the lower part of the boss portion 21. In addition, the first reinforcing part 37 is formed such that the entire part from the one end portion 37*a* to the other end portion 37*b* protrudes downward from the lower end surface of the support part 22 by approximately 6 mm, as shown in FIGS. 5 to 7, and protrudes more on the lower side than a mating surface P of the upper housing 17 and the lower housing 16. In the first reinforcing part 37, the formation position of the one end portion 37*a* is located at a position opposite to the direction of pulling of the drive chain 25 toward the crankshaft 3 via the idler shaft 28 (in the direction shown by an arrow in FIG. 7). Therefore, as described below, the first reinforcing part 37 is formed to improve the rigidity of the support part 22 against the pulling force.

As shown in FIGS. 2, 4, 5, and 7 to 10, the second reinforcing part 38 is formed in a substantially deformed shape in cross section, and is integrally connected with the upper surface of the first reinforcing part 37. That is, it is integrally connected at the width direction position and the upper position of the first reinforcing part 37, has an one end portion 38*a* which is connected to the substantially center position in the vertical direction of the support part 22, is formed to extend from the connected part to the substantially center position in the vertical direction of the boss portion 21, and has an other end portion 38*b* which is integrally connected to the boss portion 21. In addition, the second reinforcing part 38 forms part of the upper housing 17 and forms part of the space 11*a* that accommodates, thereinside, the two balancer shafts 12 and 13. As shown in FIG. 7, a lower surface 38*c* of the second reinforcing part 38 is formed as a mating surface P with the upper surface of the lower housing 16.

In addition, as shown in FIGS. 4 to 9, the first reinforcing part 37 and the second reinforcing part 38 are formed in a continuous arc-concave shape such that a continuous outer surface 39 on the side of the seated nut 29 fastened to the idler shaft 28 avoids the seated nut 29 and the area around the seated nut 29.

Working Effect of the Present Embodiment

Therefore, according to the balancer device 10, when the engine is started and the crankshaft 3 rotates, the drive side balancer shaft 12 rotates at twice the speed of the crankshaft 3 via the crank sprocket 6, the drive chain 25, the rotation transmission member 24, and the idler driven gear 23. As a result, the driven side balancer shaft 13 rotates at the same speed in the opposite direction to the drive side balancer shaft 12 via the meshing rotation transmission of the drive side gear 14 and the driven side gear 15.

Consequently, the counterweights 12*a* and 12*b* of the drive side balance shaft 12 and the counterweights 13*a* and 13*b* of the driven side balancer shaft 13 also rotate in the opposite direction to each other, canceling the centrifugal force on the right and left sides of the balancer shafts 12 and 13 themselves.

At this time, the balancer housing 11 suppresses the oil in the oil pan from interfering with each of the balancer shafts 12 and 13, and at the same time as receiving the vibratory force generated when each of the balancer shafts 12 and 13 rotates, it transmits the vibratory force to the engine.

In this way, secondary vibration is suppressed by rotating each of the counterweights 12*a* and 13*b* with the rotation of each of the balancer shafts 12 and 13 to transmit the vibratory force to the internal combustion engine 1.

In addition, in the present embodiment, since the support part 22 that supports the small diameter portion 28*a* of the idler shaft 28 has a lower part ensured in rigidity by the first reinforcing part 37, even if the drive chain 25 exerts a large pulling force in the direction of the crankshaft 3 against the idler sprocket 30, the plastic deformation of the support part 22 can be sufficiently suppressed. In other words, the inventor of the present invention formed the balancer housing 11 using aluminum material (Young's modulus 71 GPa), and verified, by analysis, the amount of plastic deformation of each support part 22 when the same chain tension of the drive chain 25 was applied to two support parts 22 having the same size via the idler shaft 28, with and without the first reinforcement 37.

According to this analysis, when the first reinforcing part 37 was not provided, the amount of the plastic deformation of the support part 22 was approximately 0.032 mm. In contrast, when the first reinforcing part 37 was provided, the amount of the plastic deformation was approximately 0.021 mm. Therefore, based on the experimental results, it was clear that when the first reinforcing part 37 was provided, the amount of the plastic deformation was approximately 0.11 mm less than when it was not provided.

Therefore, in the present embodiment, by providing the first reinforcing part 37, as mentioned above, the plastic deformation of the support part 22 can be sufficiently suppressed, and the inclination of the idler shaft 28 can be suppressed. As a result, the misalignment between the idler gear 31 of the rotation transmission member 24 and the idler driven gear 23 of the drive side balancer shaft 12 is reduced, and the occurrence of noise and vibration due to the meshing of the two gears 23 and 31 is sufficiently suppressed.

In particular, since the first reinforcing part 37 is integrally provided with the upper housing 17, the rigidity with respect to the support part 22 can be effectively increased, and the effect of suppressing the inclination of the idler shaft 28 is increased.

By extending the lower end portion of the first reinforcing part 37 downward by approximately 6 mm, the cross-sectional area of the first reinforcing part 37 can be increased. With this, rigidity of the support part 22 can be improved, and the effect of suppressing the plastic deformation is increased.

Furthermore, in the present embodiment, the rigidity of the support part 22 can be further increased by providing the second reinforcement part 38 in addition to the first reinforcing part 37, and therefore the support rigidity for the idler shaft 28 against the pulling force of the drive chain 25 is further increased. Therefore, the effect of suppressing the inclination of the idler shaft 28 is further increased, and the misalignment between the idler gear 31 and the idler driven gear 23 is reduced, thereby further increasing the effect of suppressing the generation of noise and vibration due to the meshing of the two gears 23 and 31.

In addition, since the first reinforcing part 37 and the second reinforcing part 38 are provided at positions avoiding the nut 29 with a seat for fixing the idler shaft 28, it is possible to take the outer diameter of the idler shaft 28 as large as possible without affecting the outer diameter of the idler shaft 28 due to the existence of these first and second reinforcing parts 37 and 38.

Furthermore, the outer surface 39 of the first and second reinforcing parts 37 and 38 has a circular arc shape such that they are positioned sufficiently away from the seat nut 29, thereby ensuring necessary strength and rigidity of the reinforcing parts, while ensuring effective operation space for a rotationally operating tool for the seat nut 29, such as a wrench.

In the present embodiment, although the balancer housing 11 and the support part 22 are made of aluminum material in response to the need for weight reduction, and the rigidity of the support 22 is decreased as compared with the case where they are made of cast iron, as a result of which the plastic deformation of the support part 22 by the force in the shearing direction of the idler shaft 28 on which the pulling force of the drive chain 25 acts easily occurs, the rigidity of the support part 22 and the area around the support part 22 can be increased by the first and second reinforcing parts 37 and 38, and thereby the plastic deformation of the support part 22 can be sufficiently suppressed while reducing the weight of the balancer housing 11.

Since the first reinforcing part 37 is provided at a position on the opposite side to the pulling direction of the drive chain 25 with respect to the mounting surface 22*b* of the upper housing 17 of the support part 22, to which the cylinder block 2 is mounted, by the first reinforcement 37, a supporting reaction force acts directly against the pulling force on the idler shaft 28. Consequently, the plastic deformation of the support part 22 can be effectively suppressed.

EXPLANATION OF SYMBOLS

1 . . . Internal combustion engine, 2 . . . Cylinder block, 3 . . . Crankshaft, 4 . . . Bearing cap, 6 . . . Crank sprocket, 10 . . . Balancer device, 11 . . . Balancer housing, 11*a* . . . Housing (space), 12 . . . Drive side balancer shaft, 12*a*, 12*b* . . . First and second balancer weights, 12*c* . . . Distal end shaft portion, 13 . . . Driven side balancer shaft, 13*a*, 13*b* . . . First and second balancer weights, 14 . . . Drive side gear, 15 . . . Driven side gear, 16 . . . Lower housing, 17 . . . Upper housing, 21 . . . Boss portion, 22 . . . Support part, 22*a* . . . Bolt insertion hole, 22*b* . . . Mounting surface, 23 . . . Idler driven gear, 24 . . . Rotation transmission member, 25 . . . Drive chain, 27 . . . Through hole, 28 . . . Idler shaft, 28*a* . . . Small diameter portion, 28*b* . . . Large diameter portion, 28*c* . . . Flange portion, 29 . . . Nut with seat, 30 . . . Idler sprocket, 31 . . . Idler gear, 37 . . . First reinforcing part (first thick part), 37*a* . . . One end portion, 37*b* . . . Other end portion, 38 . . . Second reinforcing part (second thick part), 38*a* . . . One end portion, 38*b* . . . Other end portion, 39 . . . Outer surface with arc-concave shape.

The invention claimed is:

1. A balancer device for an internal combustion engine, comprising:

an idler shaft holding an idler sprocket around which a drive chain is wound, and an idler gear which is rotatable with the idler sprocket;

a pair of balancer shafts which have balancer weights for generating a vibratory force by a rotation force transmitted from the idler gear;

an upper housing disposed between the pair of balancer shafts and the internal combustion engine; and a lower housing which comes in contact with the upper housing via a mating surface, and rotatably holds the pair of balancer shafts in a space formed between the upper housing and the lower housing;

wherein the upper housing includes:

a support part which supports one end portion in an axial direction of the idler shaft;

a fixing portion which is provided at a position away from the support part, and comes in contact with the internal combustion engine; and a first reinforcing part which is disposed to connect between the support part and the fixing portion, and reinforces a part on a lower housing side of the support part.

2. The balancer device for the internal combustion engine according to claim 1, further comprising a second reinforcing part which connects the first reinforcing part, the support part and the fixing portion, wherein the second reinforcing part forms a part of the upper housing to form the space, and forms a part of the mating surface of the upper housing with the lower housing.

3. The balancer device for the internal combustion engine according to claim 2, wherein a part of the first reinforcing part protrudes toward the lower housing side so as to cover the mating surface between the upper housing and the lower housing.

4. The balancer device for the internal combustion engine according to claim 3, wherein the first reinforcing part is arranged parallel to an axis of the idler shaft, at a position intersecting a virtual line coming in contact with the mating surface between the upper housing and the lower housing.

5. The balancer device for the internal combustion engine according to claim 2, wherein the idler shaft has a male screw part formed on an outer periphery of the one end portion in the axial direction, wherein the idler shaft is fixed to the support part by fastening a nut onto the male screw part in a state in which the idler shaft is inserted into a through hole formed to the support part, and wherein the first reinforcing part and the second reinforcing part are each provided at a position avoiding the nut.

6. The balancer device for the internal combustion engine according to claim 5, wherein a surface facing the nut of the first reinforcing part and the second reinforcing part is formed in a concave shape to avoid the nut.

7. The balancer device for the internal combustion engine according to claim 2, wherein the support part, the fixing portion, the first reinforcing part and the second reinforcing part are provided integrally with the upper housing.

8. The balancer device for the internal combustion engine according to claim 7, wherein the upper housing and the lower housing are made of aluminum material.

* * * * *